United States Patent [19]

Hafner et al.

[11] Patent Number: 5,280,727
[45] Date of Patent: Jan. 25, 1994

[54] ELECTROMAGNETIC FLOW MEASURING TUBE AND METHOD OF MAKING SAME

[75] Inventors: Peter Hafner, Liestal, Switzerland; Roland Unterseh, St. Louis, France

[73] Assignee: Endress+Hauser Flowtec AG, Switzerland

[21] Appl. No.: 786,388

[22] Filed: Nov. 1, 1991

[30] Foreign Application Priority Data

Sep. 11, 1987 [DE] Fed. Rep. of Germany ....... 3730641
Dec. 21, 1987 [DE] Fed. Rep. of Germany ....... 3743371

[51] Int. Cl.$^5$ ............................................. G01F 1/58
[52] U.S. Cl. ............................. 73/861.12; 73/861.11
[58] Field of Search ........... 73/861.11, 861.12, 861.13, 73/861.14, 861.16, 861.17

[56] References Cited

U.S. PATENT DOCUMENTS

| | | |
|---|---|---|
| 2,898,228 | 8/1959 | Kelley . |
| 3,009,101 | 11/1961 | Locher . |
| 3,039,051 | 6/1962 | Locher . |
| 3,286,522 | 11/1966 | Cushing . |
| 3,294,059 | 12/1966 | Barnes et al. . |
| 3,465,585 | 9/1969 | Wada ................................ 73/861.12 |
| 3,664,191 | 5/1972 | Hermanns ........................ 73/861.12 |
| 3,709,727 | 1/1973 | Miller . |
| 3,824,856 | 7/1974 | Yard . |
| 3,959,723 | 5/1976 | Wagner . |
| 4,002,996 | 1/1977 | Klebanoff et al. . |
| 4,186,600 | 2/1980 | Appel et al. . |
| 4,329,879 | 5/1982 | Appel et al. ..................... 73/861.12 |
| 4,337,279 | 6/1982 | Polak . |
| 4,403,933 | 9/1983 | Davis et al. . |
| 4,539,853 | 9/1985 | Appel et al. . |
| 4,557,957 | 12/1985 | Manniso . |
| 4,567,775 | 2/1986 | Schmoock ........................ 73/861.12 |
| 4,592,886 | 6/1986 | Mannherz . |
| 4,614,121 | 9/1986 | Hansen et al. .................... 73/861.12 |
| 4,631,969 | 12/1986 | Schmoock . |
| 4,658,652 | 4/1987 | Picone et al. ..................... 73/861.12 |
| 4,752,727 | 6/1988 | Schneider . |
| 4,782,282 | 11/1988 | Bachman . |

FOREIGN PATENT DOCUMENTS

| | | |
|---|---|---|
| 214349 | 1/1957 | Australia . |
| 0142048 | 5/1985 | European Pat. Off. . |
| 1924152 | 6/1965 | Fed. Rep. of Germany . |
| 1773484 | 11/1971 | Fed. Rep. of Germany . |
| 3011510 | 10/1981 | Fed. Rep. of Germany . |
| 3201562 | 8/1983 | Fed. Rep. of Germany . |
| 2030263 | 10/1983 | Fed. Rep. of Germany . |
| 3313448 | 10/1983 | Fed. Rep. of Germany . |
| 3340103 | 5/1985 | Fed. Rep. of Germany . |
| 187344 | 7/1965 | U.S.S.R. . |

OTHER PUBLICATIONS

Chemical Engineers' Handbook, 5th ed., Perry and Chilton, eds., McGraw-Hill Book Co., New York.
Barrett et al., "The Principles of Engineering Materials", Prentice-Hall, Inc., 1973, pp. 34, 35.
Clauser, "Industrial and Engineering Materials", McGraw-Hill Book Company, 1975, pp. 46, 47, 174, 189.
Kirk-Othmer, "Encyclopedia of Chemical Technology", John Wiley & Sons, vol. 15, 1981, pp. 253-257.

*Primary Examiner*—Richard E. Chilcot, Jr.
*Assistant Examiner*—R. Biegel
*Attorney, Agent, or Firm*—Barnes & Thornburg

[57] ABSTRACT

An electromagnetic flow measuring tube is manufactured by forming an inner member which consists substantially of plastic and thereafter coating the inner member with a material which has a lower coefficient of thermal expansion and a higher mechanical strength than the material of the inner member to form an outer member which surrounds the inner member in a form-stabilizing stiffening manner. Thus, when the inner member is formed from plastic in hot condition, as for instance by injection molding, it can cool down and solidify in a relaxed condition, so that it is free of intrinsic mechanical stresses when the outer member is applied. This eliminates the danger of a detachment of the inner member from the outer member and of subsequent occurrence of cracks in the material of the inner member. Mounting flanges, stiffening webs and other structural elements are integrally formed with the plastic inner member. This permits a simple and economic manufacture of flow measuring tubes having a complicated shape.

33 Claims, 3 Drawing Sheets

ELECTROMAGNETIC FLOW MEASURING TUBE AND METHOD OF MAKING SAME

BACKGROUND OF THE INVENTION

1. Introduction

This invention relates generally to electromagnetic flowmeters, and in particular to an electromagnetic flow measuring tube comprising an inner member formed substantially of plastic and an outer member which surrounds the inner member.

2. Description of the Prior Art

In an electromagnetic flowmeter, a magnetic field is generated in a flow measuring tube through which the fluid to be metered is conducted. The lines of flux of the magnetic field are perpendicular to the longitudinal axis of the flow measuring tube and to a transverse axis along which two electrodes are located at diametrically opposed positions. According to Faraday's law of induction, a voltage proportional to the flow velocity is induced in the fluid flowing through the flow measuring tube if the fluid is electrically conducting. This voltage is measured between the two electrodes and depends inter alia on the electrode spacing and the strength of the magnetic field. These two quantities are influenced by the geometrical dimensions of the flow measuring tube so that it is desired that the mechanical stability of the flow measuring tube be as high as possible.

As disclosed in U.S. Pat. No. 4,186,600, it is known for this purpose to provide a rigid tubular outer member, preferably a metal tube, the interior surface of which is coated with a plastic liner which is applied in a hot condition, usually by injection molding. The plastic liner serves to insulate the outer member from the electrically conducting fluid and also to protect it from damage if the fluid is chemically aggressive or corrosive. Compared with metals, plastic generally has a high thermal coefficient of expansion and low mechanical strength, in particular as regards tension, pressure and shearing. In the prior art flow measuring tubes of this kind, the plastic liner does not contribute to the mechanical stability of the flow measuring tube which is entirely provided by the rigid tubular outer member. If the flow meter is provided with mounting flanges, these are parts of the rigid tubular outer member.

When the plastic liner cools down after completion of the injection molding, the high thermal coefficient of expansion leads to a shrinkage of the plastic liner. This shrinkage can cause an at least partial detachment of the inner lining from the outer member and permanent mechanical stresses in the plastic. The detachments change the geometrical dimensions of the cross-section of the flow measuring tube, and this can lead to falsifications of the measuring voltage causing measuring errors. The mechanical stresses which are undissipated increase the risk of cracks occurring in the plastic.

It is known from U.S. Pat. No. 4,592,886 to fill the gaps formed by the detachments between the metal outer member and the plastic inner liner with a suitable material, for example a two-component epoxy, to insure in this manner the dimensional stability of the measuring tube cross-section. Introducing the filler into the intermediate spaces is however difficult. In addition, formation of a homogeneous internal cross-section is complicated.

SUMMARY OF THE INVENTION

An object of the invention is to provide a flow measuring tube which has a high dimensional stability but can be manufactured simply and economically.

It is a further object of the invention to provide a simple and economic method of making a flow measuring tube having a high dimensional stability.

The electromagnetic flow measuring tube according to the invention comprises an inner member formed substantially of plastic, the inner member having a tubular portion which defines a flow passage, an integrally formed mounting flange at each end of the tubular portion, and integrally formed flat stiffening webs extending from the flanges to the outer surface of the tubular portion, and an outer member consisting substantially of a material which has a lower coefficient of thermal expansion and a higher mechanical strength than the material of the inner member and is directly applied to the inner member by means of a coating on the inner member which outer member surrounds the inner member in a form-stabilizing stiffening manner.

A preferred method of making the electromagnetic flow measuring tube according to the invention comprises the steps of forming an inner member which consists substantially of plastic, the inner member having a tubular portion which defines a flow passage, an integrally formed mounting flange at each end of the tubular portion and integrally formed flat stiffening webs extending from the flanges to the outer surface of the tubular portion, and thereafter applying to the inner member an outer member consisting substantially of a material which has a lower coefficient of thermal expansion and a higher mechanical strength than the material of the inner member by means of a coating on the inner member, which outer member surrounds the inner member in a form-stabilizing stiffening manner and at least partially covers the exterior surface of the inner member.

The shape and the geometrical dimensions of the flow measuring tube according to the invention are determined by the inner member which is a separately formed plastic body. This plastic inner member also comprises the integrally formed mounting flanges, stiffening webs and other structural components that may be required, such as electrode studs. Since the outer member is applied to the inner member by means of a coating, it adopts the shape of the inner member however irregular this shape may be. This permits an easy and economic manufacture of electromagnetic flow measuring tubes of complicated shapes.

An important advantage of the flow measuring tube according to the invention and the method of manufacturing it results from the fact that the formation of the inner member is completed before the outer member is applied. Thus, when the inner member is formed from plastic in hot condition, as for instance by injection molding, it can cool down and solidify in a relaxed condition, so that it is free of intrinsic mechanical stresses when the outer member is applied. This eliminates the danger of a detachment of the inner member from the outer member and of subsequent occurrence of cracks in the material of the inner member. The subsequent application of the outer member does not cause any appreciable deformation of the cross-section of the inner member or stresses in the material of the inner member.

BRIEF DESCRIPTION OF THE DRAWINGS

For a better understanding of the invention as well as other objects and further features thereof, reference is made to the following description to be read in conjunction with the drawings, wherein.

DETAILED DESCRIPTION OF THE PREFERRED EMBODIMENTS

Figure 1:
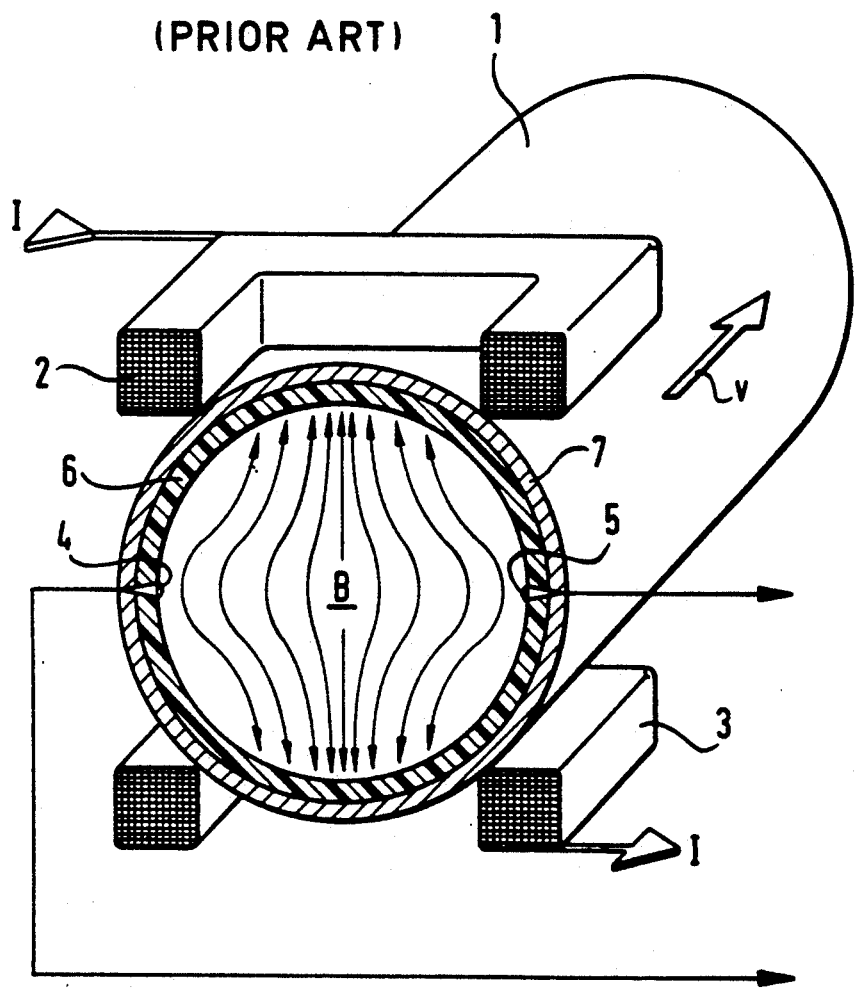
FIG. 1 shows a prior art electromagnetic flowmeter.

The prior art electromagnetic flowmeter shown in FIG. 1 comprises a measuring tube 1 through which an electrically conductive liquid to be metered flows with a velocity v. Two exciting coils 2 and 3 through which an alternating current or a pulsating DC current I flows generate in the interior of the measuring tube 1 a magnetic field B perpendicular to the longitudinal axis of the measuring tube 1. According to the well-known principles of electromagnetic flowmeters which are based on Faraday's law of induction an electric voltage proportional to the flow velocity v is induced in the flowing liquid. The induced voltage is measured between two electrodes 4 and 5 located at diametrically opposed positions along a transverse axis which is perpendicular both to the longitudinal axis of the measuring tube 1 and to the direction of the magnetic field B. The electrodes 4 and 5 can be in electric contact with the liquid for conductive collection of the induced voltage, or they can be electrically insulated from the liquid for capacitive collection of the induced voltage.

The measuring tube 1 comprises a stainless steel tube 7 which is provided with a plastic inner lining 6. The function of the inner lining 6 is to insulate the stainless steel tube 7 from the electrically conductive liquid.

Figure 2:
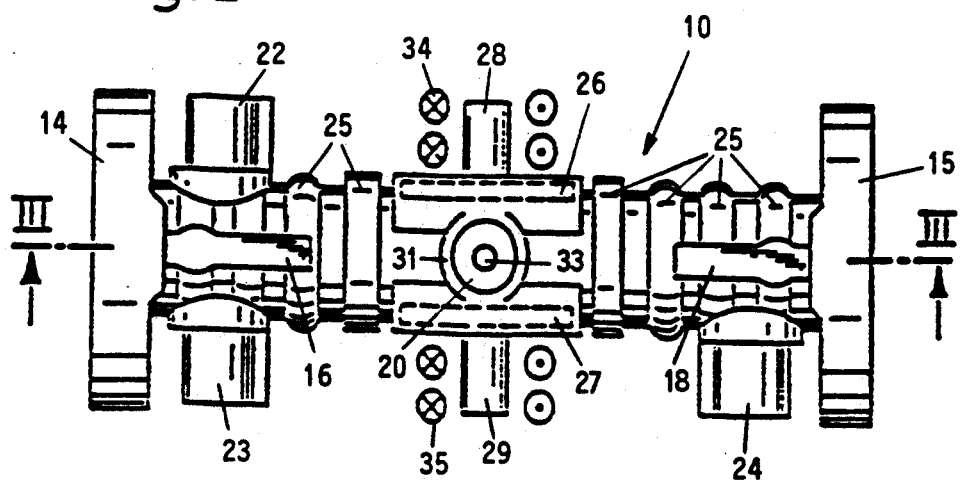
FIG. 2 is a plan view of an electromagnetic flow measuring tube in accordance with the invention.
Figure 3:
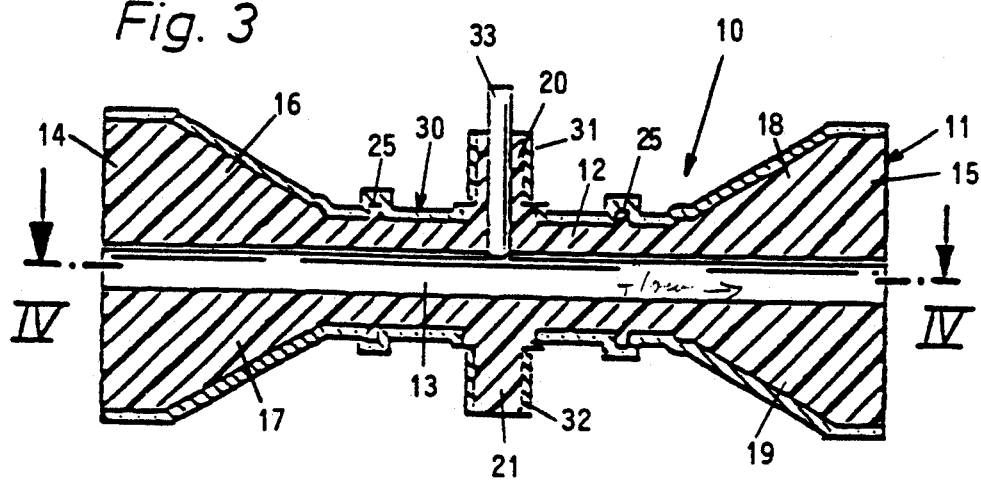
FIG. 3 is a section taken through the electromagnetic flow measuring tube shown in FIG. 2 on the plane indicated by line III—III therein.
Figure 4:
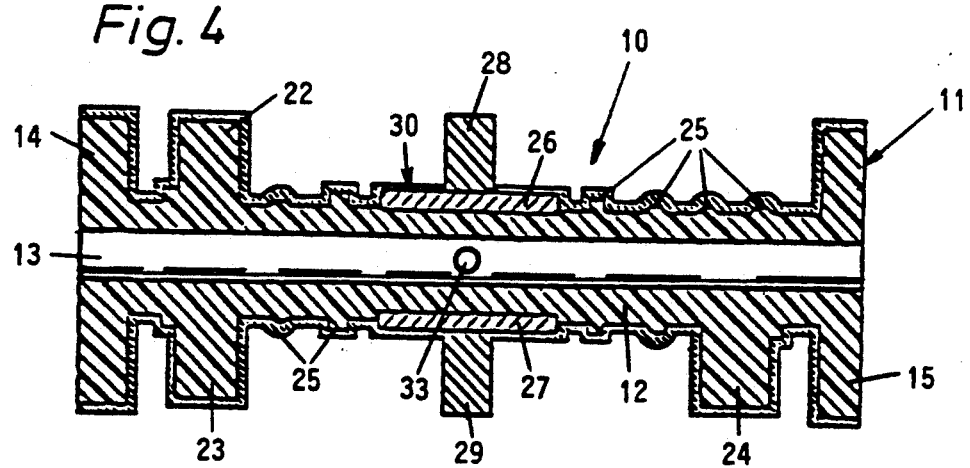
FIG. 4 is a section taken through the electromagnetic flow measuring tube on the plane indicated by line IV—IV in FIG. 3.

FIGS. 2 to 4 show a first embodiment of a measuring tube 10 made according to the invention. The shape and structure of the measuring tube will be apparent from the following description of the method by which it is manufactured.

First, an inner member 11 is formed as a solid body of plastic material. This is preferably done by injection molding. The greater part of the inner member 11 is formed by a thick-walled tubular portion 12 having an axial flow channel 13. At each end of the tubular portion 12 a mounting flange 14, 15 is integrally formed with the tubular portion 12 from the plastic material. Flat stiffening webs 16 and 17 of triangular shape are integrally formed with the tubular portion 12 and the flange 14 in a common plane at diametrically opposed positions, the outer edges of the webs 16 and 17 extending from the periphery of the flange 14 to the outer surface of the tubular portion 12. Likewise, flat stiffening webs 18 and 19 of triangular shape are integrally formed with the tubular portion 12 and the flange 15 at diametrically opposed positions in the same plane as the webs 16 and 17, the outer edges of the webs 18 and 19 extending from the periphery of the flange 15 to the outer surface of the tubular portion 12.

In the middle of the tubular portion 12 two electrode studs 20 and 21 are formed integrally with the tubular portion from the plastic material. The electrode studs 20 and 21 extend radially from the tubular portion 12 at diametrically opposed positions in the same plane as the webs 16 to 19. Further electrode studs 22, 23 and 24 are formed integrally with the tubular portion 12 from the plastic material in the vicinity of the flanges 14 and 15, respectively, the electrode studs 22 to 24 extending radially from the tubular portion 12 in a plane which is normal to the plane of the electrode studs 20 and 21.

A plurality of circumferential ribs 25 is integrally formed on the outside of the tubular portion 12 in the regions situated between the electrode studs 20, 21 and the flanges 14, 15, respectively.

After the formation of the inner member 11 in the before-described manner, pole shoes 26 and 27 connected to magnetic cores 28 and 29, respectively, are attached to the outside of the tubular portion 12 in the middle thereof between the flanges 14 and 15 at diametrically opposed positions so that the cores 28 and 29 extend radially from the tubular portion 12 in a plane which is normal to the plane of the electode studs 20 and 21. Preferably the pole shoes 26 and 27 are placed in corresponding recesses formed in the outer surface of the tubular portion 12. The pole shoes with the attached cores can be held in place by any suitable means during the following manufacturing step, for instance by fixing pins extending into corresponding holes provided in the inner member 11, or by external holding means.

In the next manufacturing step the exterior surfaces of the inner member 11 and of the pole shoes 26, 27 are directly coated with a material having a lower coefficient of thermal expansion and a higher mechanical strength than the material of the inner member 11 to form an outer member 30 which surrounds the inner member 11 in a form-stabilizing stiffening manner. As coating material preferably a non-ferromagnetic metal is used, in particular copper. The coating can be done by any one of the known coating methods, in particular electroplating, chemical deposition or one of the thermal spraying methods, such as plasma spraying or flame spraying. Preferred materials for the inner member 11 are fluoroplastics, for example Teflon (PTFE, polytetrafluoroethylene) or Hostaflon (ETFE, ethylene tetrafluoroethylene) which can particularly well be coated with copper.

If certain parts of the measuring tube 10 are not to be covered by the outer member 30, this can be achieved either by covering these parts with suitable masks during the coating process or by locally removing the coating material from these parts after the coating. In the embodiment of FIGS. 2 to 4, for instance, the end faces of the flanges 14 and 15, the end faces of the electrode studs 20 and 21, and the magnetic cores 28 and 29 are not covered with the coating material of the outer member. Preferably, the magnetic cores 28 and 29 are covered with removable sleeves, and the end faces of the flanges 14 and 15 with covering plates during the coating process. The coating material on the end faces of the electrode studs 20 and 21 may be removed after the coating, and in the same step a separation may be provided between the coating material on the circumferential surfaces of the electrode studs 20, 21 and the coating material on the tubular portion 12 so that shield sleeves 31 and 32 are formed on the electrode studs.

For finishing the measuring tube 10, bores are provided in the electrode studs 20 to 24, as required, and pin-shaped electrodes are pressed into these bores In the upper half of FIG. 3 a measuring electrode 33 is shown which is pressed in a bore provided in the electrode stud 20. A second measuring electrode will be pressed in a bore that will be provided in the electrode stud 21. Two further electrodes can be mounted in the same manner in the electrode studs 23 and 24 which can be used for applying a desired potential, such as mass potential. A further electrode mounted in the electrode stud 22 can, for instance, be used to determine whether the liquid contains air bubbles or whether the measuring tube is completely filled with the liquid, provided that the measuring tube is installed in the position shown in FIG. 2 where the electrode stud 22 extends vertically upwards. If such additional electrodes are to be provided it is, of course, necessary to remove the coating material from the end faces of the electrode studs in order to avoid a short-circuiting of the electrodes if the coating material is electrically conductive.

Finally, exciting coils 34 and 35 are mounted on the magnetic cores 28 and 29, respectively.

With the coating method a firm bonding of the outer member 30 on the plastic inner member 11 is achieved. The inner member can cool down and relax freely after it has been formed and before the material of the outer member is applied so that the inner member is free of inherent mechanical stresses when the outer member is applied by coating. This largely eliminates the probability of a subsequent occurrence of cracks in the material of the inner member. The application of the outer member by coating does not lead to any appreciable deformation of the inner member.

A further advantage of the coating method is that the outer member can be made up of layers of different materials. This is done for example by means of different electroplating baths. Thus, at first a bonding layer can be applied of a material which adheres particularly firmly to the plastic material of the inner member, and then one or more further layers can be applied on the bonding layer to provide the desired form-stabilizing and stiffening effect.

By the use of masks during the coating steps regions of different properties can be provided in the outer member. For instance, by applying layers of different materials regions of different conductivity can be produced in order to prevent eddy currents. Moreover, it is possible to create functional components of the flowmeter, such as electrodes, by taking advantage of the various possibilities of the coating method.

Figure 5:
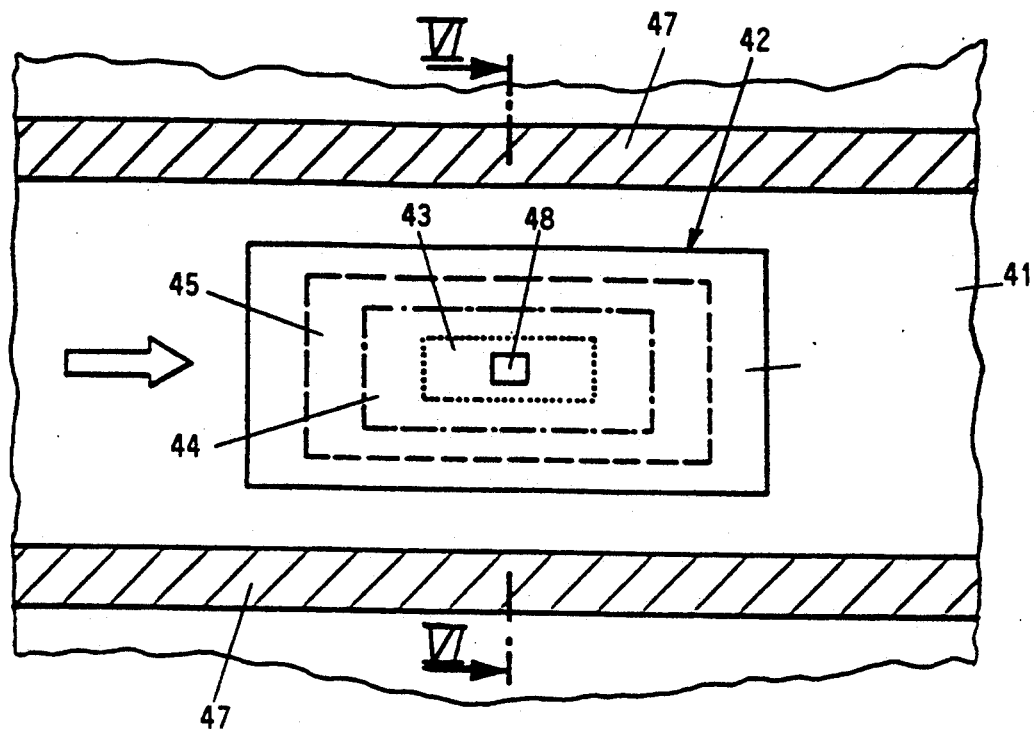
FIG. 5 is a section taken through a part of another electromagnetic flow measuring tube in accordance with the invention on the plane indicated by line V—V in FIG. 6.
Figure 6:
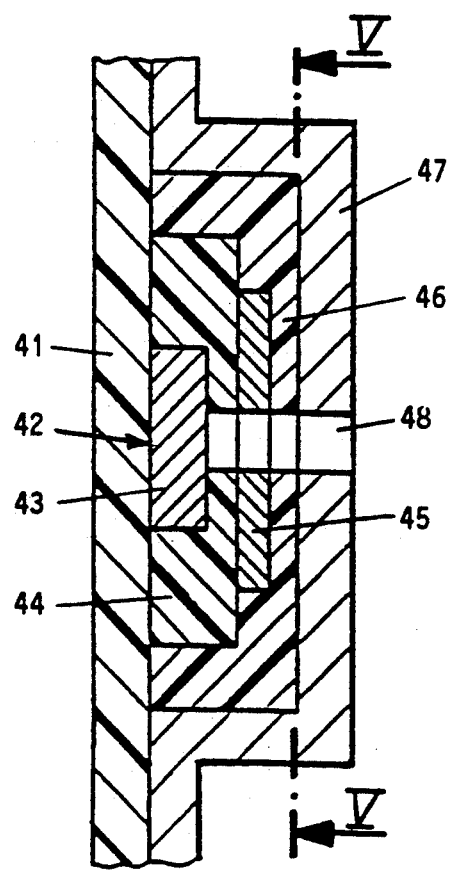
FIG. 6 is a section taken through the part of the electromagnetic flow measuring tube shown in FIG. 5 on the plane indicated by line VI—VI therein.

Referring to FIGS. 5 and 6, a modified embodiment of the invention is illustrated in order to explain how the coating method used for the production of the outer member can be utilized for making measuring electrodes for capacitive collection of the induced voltage. FIG. 5 is a partially sectioned plan view along the line V—V of FIG. 6 of that part of the measuring tube which contains one of the two measuring electrodes, and FIG. 6 is an enlarged sectional view, not true to scale, along the line VI—VI of FIG. 5. The other measuring electrode is, of course, identical to the one shown in FIGS. 5 and 6 and will, therefore, not be described.

FIGS. 5 and 6 show a portion of the inner member 41 of the measuring tube which may be manufactured in the same way as the inner member 11 of FIGS. 2 to 4, but without the electrode studs for the measuring electrodes. The measuring electrode 42 is formed prior to the formation of the outer member by coating steps which are compatible with the coating method used for forming the outer member. A first electrically conductive layer 43 (indicated in dotted lines in FIG. 5) is applied onto a portion of the surface of the inner member 41. In operation, this first conductive layer 43 forms one plate of a capacitor, of which the dielectric is the non-conducting material of the inner member 41 and the other plate is the electrically conductive fluid which flows in the direction of the arrow of FIG. 5 through the measuring tube.

The first conductive layer 43 is then at least partially coated with a first electrically insulating layer 44 which in turn is at least partially coated with a second electrically conductive layer 45 to form a shield electrode in particular against stray capacitances. The layer 45 is expediently connected to ground or earth potential which can be done via a further conductive layer, not shown. If the material of the outer member is electrically conductive, for instance copper, the second conductive layer is coated with a second electrically insulating layer 46. The extent of the two insulating layers 44 and 46 can optionally be limited to the regions of the first and second conductive layers 43 and 45, respectively, or cover the entire outer surface of the inner member 41. Finally, the outer member 47 is formed by coating the outer surface of the inner member 41 and the structure formed by the layers 43 to 46 with one or more layers, as described before with reference to the embodiment of FIGS. 2 to 4.

In the specific embodiment of FIGS. 5 and 6 the insulating layer 44, the conductive layer 45, the insulating layer 46 and the outer member 47 comprise aligned cutouts which together form an opening 48 leading to the first conductive layer 43. This makes it possible to contact in a simple manner the first conductive layer 43, which ist the active part of the measuring electrode 42, from outside the outer member 47.

The layers of the second measuring electrode are formed simultaneously with the corresponding layers 43 to 46 of the first measuring electrod by the same process steps. If desired, further electrically conductive and insulating layers may simultaneously be applied on the inner member 41 for other purposes, for instance to form electrodes at the places of the electrode studs 22, 23 and/or 24 of the embodiment of FIGS. 2 to 4.

The embodiment of FIGS. 5 and 6 shows that the production method according to the invention is particularly suitable for measuring tubes with capacitive electrodes because the structure of capacitive electrodes is formed essentially by layers covering each other (dielectric, capacitor plate, insulation, shield electrode, etc.) and such layers can conveniently be applied in the course of the method used for manufacturing the measuring tube according to the invention.

What is claimed is:

1. An electromagnetic flow measuring tube comprising an inner member formed substantially of plastic, the inner member having a tubular portion including an outer surface and an inner surface which defines a flow passage, an integrally formed mounting flange at each end of the tubular portion, and webs extending from the flanges to the outer surface of the tubular portion, the webs being formed integrally with the tubular portion and the flanges to stabilize the flanges and the tubular portion against deformation, the inner member including integrally formed electrode studs extending from the tubular portion at generally right angles to the axis of the flow passage, a bore formed in at least some of these electrode studs, and an electrode pressed into each of the bores, and an outer member consisting substantially of a material which has a lower coefficient of thermal expansion and a higher mechanical strength than the material of the inner member and is directly applied to the inner member by means of a coating on the inner member which outer member surrounds the inner member to stabilize and strengthen the inner member.

2. The electromagnetic flow measuring tube according to claim 1 comprising electrically conductive layers applied on parts of the exterior surface of the inner tubular portion to form capacitive voltage collection electrodes and electrically insulating layers applied to at least a part of the electrically conductive layers.

3. The electromagnetic flow measuring tube according to claim 1 wherein the electrically insulating layers are provided with one or more cutouts in such a manner that the electrically conductive layers can be contacted from outside the outer member.

4. The electromagnetic flow measuring tube according to claim 1, further comprising pole shoes connected to magnetic cores, and means for coupling the pole shoes and the magnetic cores to the inner member.

5. The electromagnetic flow measuring tube according to claim 1 wherein the outer member is formed from electrically conductive material.

6. The electromagnetic flow measuring tube according to claim 5 wherein the material of the outer member is copper.

7. The electromagnetic flow measuring tube according to claim 1 wherein the inner member is formed by injection molding before the coating which forms the outer member is applied to the inner member.

8. The electromagnetic flow measuring tube according to claim 1 wherein the inner member is formed of fluoroplastic.

9. The electromagnetic flow measuring tube according to claim 1 wherein the inner member has a plurality of circumferential ribs formed on the outer surface of the tubular portion.

10. A flow measuring tube comprising:
an inner member formed substantially of a plastic material, the inner member being formed to include a tubular portion having an outer surface and an inner surface which defines a flow passage therethrough, a mounting flange formed integrally with the tubular portion at each end of the tubular portion, and web members extending from the flanges to the outer surface of the tubular portion, the web members being formed integrally with and from the same material as the tubular portion and the flanges, the inner member further including integrally formed electrode studs extending from the tubular portion transverse to a longitudinal axis of the flow passage, a bore formed in at least some of these electrode studs, and an electrode pressed into each of the bores; and
an outer member formed substantially of a material which has a lower coefficient of thermal expansion and a higher mechanical strength than the material of the inner member, the outer member being applied to the inner member by means of a coating on the inner member which outer member surrounds the inner member to stabilize and strengthen the inner member.

11. The flow measuring tube of claim 10, further comprising electrically conductive layers applied on parts of the exterior surface of the inner tubular portion to form capacitive voltage collection electrodes, and electrically insulating layers applied to at least a part of the electrically conductive layers.

12. The flow measuring tube of claim 10, further comprising pole shoes coupled to magnetic cores, and means for coupling the pole shoes and magnetic cores to the inner member.

13. The flow measuring tube of claim 10, wherein the outer member is formed from electrically conductive material.

14. The flow measuring tube of claim 10, wherein the inner member is formed to include a plurality of circumferential ribs extending outwardly from the outer surface of the tubular portion.

15. A flow measuring tube comprising:
an inner member formed substantially of a plastic material to establish a general shape and geometric dimensions of the flow measuring tube, the inner member being formed to include a tubular portion having an outer surface and an inner surface which defines a flow passage therethrough and a mounting flange formed integrally with the tubular portion at each end of the tubular portion, the inner member further including integrally formed electrode studs extending from the tubular portion transverse to a longitudinal axis of the flow passage, a bore formed in at least some of these electrode studs, and an electrode pressed into each of the bores; and
a coating applied to the outer surface of the inner member after the inner member is formed, the coating conforming generally to the shape and geometric dimensions of the inner member to form an outer member which surrounds the inner member, the outer member being formed substantially of a material which has a lower coefficient of thermal expansion and a higher mechanical strength than the material of the inner member to stabilize and strengthen the inner member.

16. The flow measuring tube of claim 15, wherein the inner member further comprises web members extending from the flanges to the outer surface of the tubular portion, the web members being formed integrally with and from the same material as the tubular portion and the first and second flanges to stabilize the flanges and the tubular portion against deformation.

17. The flow measuring tube of claim 15, further comprising electrically conductive layers applied on parts of the exterior surface of the inner tubular portion to form capacitive voltage collection electrodes, and electrically insulating layers applied to at least a part of the electrically conductive layers.

18. A flow measuring tube comprising:
an inner member formed substantially of a plastic material, the inner member formed to include a tubular portion having an outer surface and an inner surface which defines a flow passage therethrough, a mounting flange formed integrally with the tubular portion at each end of the tubular portion, and web members extending from the flanges to the outer surface of the tubular portion, the web members being formed integrally with and from the same material as the tubular portion and the flanges; and an outer member formed substantially of an electrically conductive material which has a lower coefficient of thermal expansion and a higher mechanical strength than the material of the inner member, the outer member being applied to the inner member by means of a coating on the inner member which outer member surrounds the inner member to stabilize and strengthen the inner member.

19. The flow measuring tube of claim 18, wherein the inner member further includes integrally formed electrode studs extending from the tubular portion transverse to a longitudinal axis of the flow passage, a bore formed in at least some of these electrode studs, and an electrode pressed into each of the bores;

20. The flow measuring tube of claim 18, further comprising electrically conductive layers applied on parts of the exterior surface of the inner tubular portion to form capacitive voltage collection electrodes, and electrically insulating layers applied to at least a part of the electrically conductive layers.

21. The flow measuring tube of claim 18, further comprising pole shoes coupled to magnetic cores, and means for coupling the pole shoes and magnetic cores to the inner member.

22. The flow measuring tube of claim 18, wherein the inner member is formed to include a plurality of circumferential ribs extending outwardly from the outer surface of the tubular portion.

23. A flow measuring tube comprising:
an inner member formed substantially of a plastic material to establish a general shape and geometric dimensions of the flow measuring tube, the inner member being formed to include a tubular portion having an outer surface and an inner surface which defines a flow passage therethrough and a mounting flange formed integrally with the tubular portion at each end of the tubular portion;
a coating applied to the outer surface of the inner member after the inner member is formed, the coating conforming generally to the shape and geometric dimensions of the inner member to form an outer member which surrounds the inner member, the outer member being formed substantially of a material which has a lower coefficient of thermal expansion and a higher mechanical strength than the material of the inner member to stabilize and strengthen the inner member;
electrically conductive layers applied on parts of the outer surface of the inner tubular portion to form capacitive voltage collection electrodes; and
electrically insulating layers applied to at least a part of the electrically conductive layers.

24. The flow measuring tube of claim 23, wherein the inner member further comprises web members extending from the flanges to the outer surface of the tubular portion, the web members being formed integrally with and from the same material as the tubular portion and the first and second flanges to stabilize the flanges and the tubular portion against deformation.

25. The flow measuring tube of claim 23, wherein the inner member further includes integrally formed electrode studs extending from the tubular portion transverse to a longitudinal axis of the flow passage, a bore formed in at least some of these electrode studs, and an electrode pressed into each of the bores.

26. An electromagnetic flow measuring tube comprising an inner member formed substantially of plastic, the inner member having a tubular portion including an outer surface and an inner surface which defines a flow passage, an integrally formed mounting flange at each end of the tubular portion, and webs extending from the flanges to the outer surface of the tubular portion, the webs being formed integrally with the tubular portion and the flanges to stabilize the flanges and the tubular portion against deformation, and an outer member consisting substantially of an electrically conductive material which has a lower coefficient of thermal expansion and a higher mechanical strength than the material of the inner member and is directly applied to the inner member by means of a coating on the inner member which outer member surrounds the inner member to stabilize and strengthen the inner member.

27. The flow measuring tube of claim 26, further comprising electrically conductive layers applied on parts of the exterior surface of the inner tubular portion to form capacitive voltage collection electrodes, and electrically insulating layers applied to at least a part of the electrically conductive layers.

28. The flow measuring tube of claim 27, wherein the electrically insulating layers are provided with one or more cutouts in such a manner that the electrically conductive layers can be contacted from outside the outer member.

29. The flow measuring tube of claim 26, further comprising pole shoes coupled to magnetic cores, and means for coupling the pole shoes and magnetic cores to the inner member.

30. The flow measuring tube of claim 26, wherein the material of the outer member is copper.

31. The flow measuring tube of claim 26, wherein the inner member is formed by injection molding before the coating which forms the outer member is applied to the inner member.

32. The flow measuring tube of claim 26, wherein inner member is formed of fluoroplastic.

33. The flow measuring tube of claim 26, wherein the inner member has a plurality of circumferential ribs formed on the outer surface of the tubular portion.

* * * * *

UNITED STATES PATENT AND TRADEMARK OFFICE
CERTIFICATE OF CORRECTION

PATENT NO. : 5,280,727
DATED : January 25, 1994
INVENTOR(S) : Peter Hafner, et. al.

It is certified that error appears in the above-indentified patent and that said Letters Patent is hereby corrected as shown below:

Title page, item [63], under Related U.S. Application Data should read
-- Continuation-in-part of Ser. No. 07/241,085, filed Sept. 6, 1988.--

Signed and Sealed this

Nineteenth Day of July, 1994

Attest:

BRUCE LEHMAN

*Attesting Officer*    Commissioner of Patents and Trademarks